Apr. 17, 1923.
C. HERMANN
1,451,909
AUTOMOBILE SIGNAL DEVICE
Filed Dec. 22, 1921
2 Sheets-Sheet 1
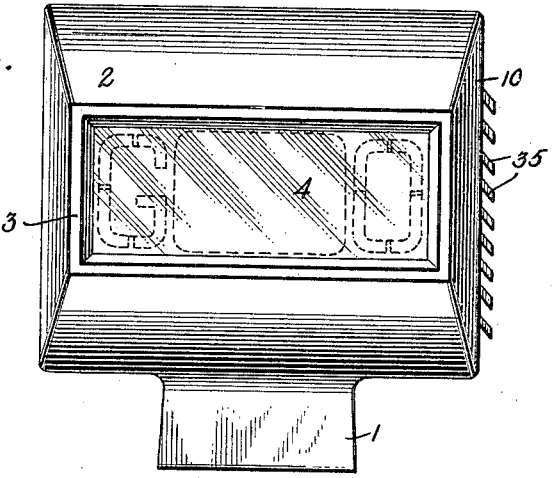
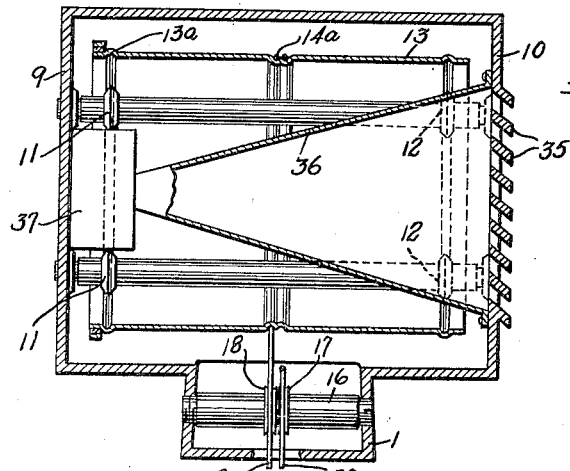
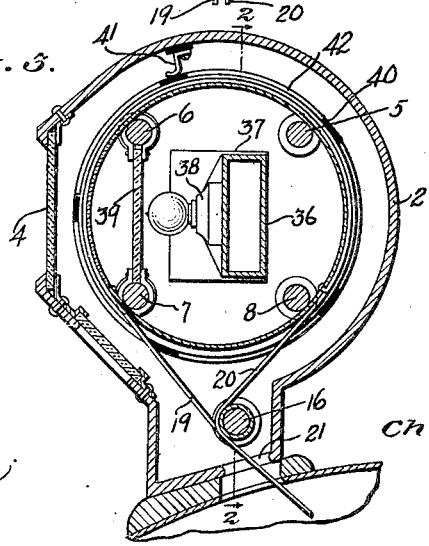
WITNESSES
INVENTOR
Charles Hermann
BY
ATTORNEYS Apr. 17, 1923.
C. HERMANN
1,451,909
AUTOMOBILE SIGNAL DEVICE
Filed Dec. 22, 1921
2 Sheets-Sheet 2
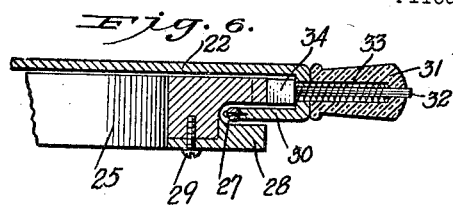
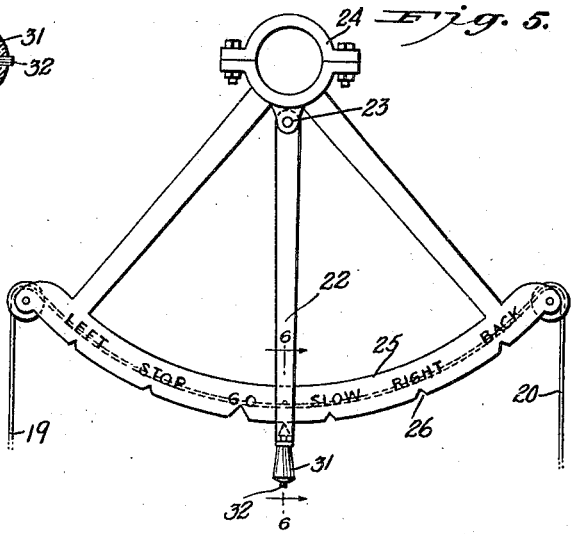
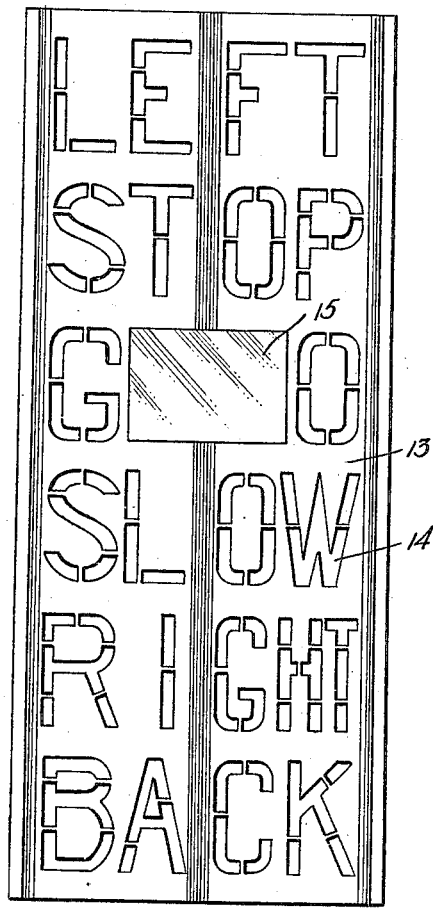
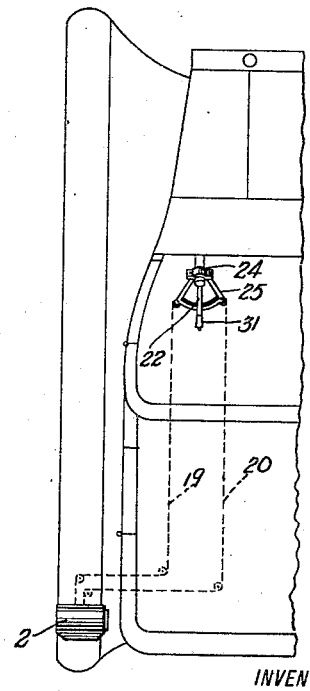
INVENTOR
Charles Hermann
BY
ATTORNEYS
WITNESSES Patented Apr. 17, 1923.

1,451,909

UNITED STATES PATENT OFFICE.

CHARLES HERMANN, OF BROOKLYN, NEW YORK.

AUTOMOBILE SIGNAL DEVICE.

Application filed December 22, 1921. Serial No. 524,199.

*To all whom it may concern:*

Be it known that I, CHARLES HERMANN, a citizen of Rumania, and a resident of the city of New York, borough of Brooklyn, Coney Island, in the county of Kings and State of New York, have invented a new and Improved Automobile Signal Device, of which the following is a full, clear, and exact description.

This invention relates to an automobile signal device, and has for an object the provision of means whereby automobile signals can by simply operated means be easily and quickly exhibited or produced at the will of the operator.

Another object resides in the provision of means whereby the mechanism can be readily assembled on any type of car without altering the construction of the car.

A further object resides in the provision of means whereby the cost to the public of this device would be reduced to a minimum because of the extreme simplicity of the parts and the consequent ease of manufacturing them.

A still further object resides in the particular construction and arrangement of parts which are hereinafter described and claimed and shown in the accompanying drawings.

The invention is illustrated in the drawings, of which—

Figure 1 is a front elevation of the signal casing.

Fig. 2 is a vertical section taken therethrough on the line 2—2 of Fig. 3.

Fig. 3 is a transverse section taken through the casing.

Fig. 4 is a development of the signal cylinder.

Fig. 5 is a plan view of the signal lever sector.

Fig. 6 is a section taken on the line 6—6 of Fig. 5.

Fig. 7 is a diagrammatic plan view of the car or vehicle to which the signal mechanism is applied.

The form of the invention shown in the drawings is a preferred form, although it is understood that modifications in the construction and arrangement of the parts and in the character of the materials used may be adopted without departing from the spirit of the invention.

The invention comprises a signal casing having a pedestal portion 1 mounted in any suitable manner on any part of a vehicle of the movement of which signals are to be exhibited. A substantially cylindrical signal casing 2 is mounted on a pedestal portion 1 and as shown is preferably made integral therewith. This casing is entirely enclosed except for an opening such as 3 in one side thereof. In this opening is disposed a transparent medium such as a sheet of glass 4. Within this casing I dispose a plurality of rods or shafts such as 5, 6, 7 and 8. These shafts are suitably supported in the end walls such as 9 and 10 of the casing. On each of these shafts are mounted at opposite ends thereof a pair of rollers such as 11 and 12. These rollers are suitably mounted on the shafts to ride freely and with a minimum amount of friction. The shafts, as shown in Fig. 3, are arranged approximately on the corners of a rectangle, and around the shafts is bent the signalling cylinder 13 which is made preferably of sheet metal and then is bent into form, the free ends being connected in any suitable manner. This cylinder is provided with a plurality of circumferential grooves such as 13ª and 14ª. The grooves 13ª are formed on the inner face of the cylinder to receive the rollers, and the grooves 14ª are formed on the outer face of the cylinder to receive the operating cables to be hereinafter mentioned. This cylinder is provided with a plurality of signal characters which are preferably stamped therein by cutting out the metal. Such characters are the words "Left," "Stop", "Go", "Slow", "Right", and "Back", and are represented by the numeral 14. An opening 15 is provided in the cylinder 13 between the two letters of the word "Go", and this word is normally disposed opposite the opening 3 of the signal casing and the cylinder is normally moved in either direction from this position. The opening 15 is filled preferably with red glass.

The pedestal portion 1 is hollow and therein is journaled another rod 16 on which are mounted a pair of pulleys 17 and 18. Over these pulleys extend cables such as 19 and 20, the ends of which are suitably fastened in any desired manner to the cylinder 13. These cables extend through an opening 21 in the bottom of the pedestal portion and are respectively connected to an operating lever 22. This lever is pivotally connected at 23 to a bracket or clamp 24. This clamp or bracket is preferably attached around the steering post of an automobile. On this bracket is formed a signal sector 25 provided at intervals on its periphery with the various signal characters it is desired to exhibit. On the peripheral edge of the sector 25, opposite the various signal characters, I form indentations such as 26. A groove or channel passage 27 is formed between the lower face of the sector plate 25 and a flange plate 28 suitably connected relatively thereto and held therein by a plurality of set screws such as 29. The end of the operating lever 22 is U shaped, one leg 30 of which extends into the channel passage 27. To the end of this leg 30 of the lever, the operating cables 19 and 20 are connected. As a matter of fact, these cables 19 and 20 may be one continuous cable.

The lever 22 is provided with a handle portion 31 which is hollow. Within this hollow portion a stem 32 is adapted to slide. Around this stem a spring 33 is disposed to bear against a latch finger 34. This latch finger is mounted on the inner end of the stem 32 and is forced forward by the spring 33 to rest against the peripheral edge of the sector 25. As the operating lever is moved around, this finger moves into engagement with any one of the indentations 26 to temporarily latch the lever in any desired position.

The wall 10 of the signal casing is provided with a plurality of spaced, inclined slats 35, and against the inner face of the wall adjacent these slats is disposed the horn 36 of a sound-producing device 37, such as an audible signal mechanism. This horn 36 is disposed in the space within the signal cylinder. Against the side of the horn, as shown in Fig. 3, there may be mounted a light unit 38, which would, therefore, be disposed back of the glass plate 4. An additional glass plate 39 is disposed between two of the rods or shafts 6 and 7 in front of the lamp 38.

In the normal position of the operating lever, which is preferably on the word "Go", this word is indicated through the aperture 3 and illuminated by the light 38. Preferably the glass 39 is one of any color so that the lamp and the glass illuminated will serve as a tail light. Whenever a change in the motion is to be indicated, the lever 22 is moved in the desired direction to the point on the sector on which this signal is designated. The movement of the lever will operate the cables and move the cylinder till this proper designation is exhibited. In this position the lever is temporarily latched in the manner above described.

On one edge of the cylinder 13 I provide a plurality of insulated sections such as 40 with which a switch or contact 41 engages whenever the operating lever or handle 22 is opposite one of the notches 26. During the period that the lever is between notches, the spring contact 41 engages with a conducting section 42 and makes circuit to the audible signal 37. The particular circuit connections are not shown since it is obvious to connect the horn in circuit with the battery and the contacts.

This device, therefore, comprises a casing in which a signal cylinder is rotatably mounted and which cylinder also contains the means for producing an audible signal, as well as means for illuminating the various characters to be exhibited and for forming a tail light. The simplicity of operation of this device and its construction results in a device that can be very economically manufactured and can be easily operated by any driver and applied to any type of car with a minimum expenditure of time and labor.

What I claim is:

1. An automobile signalling and indicating device, which comprises a casing to be mounted on the body of the automobile and having an exhibiting opening, a hollow rotatable signal character drum mounted within the casing, an audible signal disposed in the casing within the signal drum, and a horn connected thereto, said casing having an aperture in one face thereof to which one end of said horn is connected.

2. An automobile signalling and indicating device which comprises a hollow casing to be mounted on the automobile, a rotatable signal drum or cylinder within the casing, said drum formed of a single strip of sheet metal with signal characters marked thereon, a plurality of roller bearings within said casing, said drum having peripheral grooves in which said rollers ride, rollers rotatably supporting the frame, and means connected to the drum extending to the operator's position for actuating the drum, said casing having an exhibiting aperture therein.

3. An automobile signalling and indicating device which comprises a casing, a plurality of shafts supported therein, roller bearings on said shafts, a hollow cylindrical drum disposed around said shafts, a rotatable support on said roller bearing, said drum having signal characters thereon, said casing having an exhibiting aperture therein, and means connected with the drum and extending to an operator's position whereby the drum can be moved to dispose any desired character opposite the aperture.

4. An automobile signalling and indicating device which comprises a hollow casing to be mounted on a vehicle, a plurality of roller bearings mounted within the casing, a hollow signalling drum, said drum having inner peripheral grooves in which the roller bearings rest, and an operating cable connected to said drum, said drum having outer peripheral grooves in which said cable rests.

5. An automobile signalling and indicating device which comprises a casing to be mounted on the automobile, a hollow rotatable signal drum within said casing, an audible signal mounted on the casing within the hollow drum, a flared horn connected to said signal, the large end of the horn being disposed against one wall of the casing, said casing at this point being provided with an aperture, and a plurality of inclined slats disposed across said aperture.

CHARLES HERMANN.